(12) United States Patent
Sodoski et al.

(10) Patent No.: US 6,633,802 B2
(45) Date of Patent: Oct. 14, 2003

(54) POWER MANAGEMENT UNDER LIMITED POWER CONDITIONS

(75) Inventors: Anthony F. Sodoski, Newtown, CT (US); Bruce S. Hamilton, Sandy Hook, CT (US); Michael P. Bradford, Orange, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 0 days.

(21) Appl. No.: 09/800,075

(22) Filed: Mar. 6, 2001

(65) Prior Publication Data

US 2002/0128759 A1 Sep. 12, 2002

(51) Int. Cl.⁷ .............................. H02H 7/00; G06F 15/56
(52) U.S. Cl. .............................. 701/36; 307/29; 307/64; 307/66; 307/85; 361/25; 322/28; 322/33; 322/34
(58) Field of Search .............................. 701/36; 307/29, 307/39, 64, 66, 84, 85, 65, 57, 76, 31, 153, 154; 361/20, 25; 322/28, 33, 8, 34, 37, 67; 364/492

(56) References Cited

U.S. PATENT DOCUMENTS

| | | | |
|---|---|---|---|
| 3,704,380 A | 11/1972 | Cohn | |
| 3,842,249 A | 10/1974 | Geyer et al. | |
| 4,403,292 A | * 9/1983 | Ejzak et al. | 307/19 |
| 4,551,632 A | 11/1985 | Jourdan et al. | |
| 5,262,960 A | * 11/1993 | Said et al. | 364/495 |
| 5,422,517 A | 6/1995 | Verney et al. | |
| 5,583,419 A | 12/1996 | Haller | |
| 5,604,421 A | 2/1997 | Barnsley | |
| 5,606,245 A | 2/1997 | Kirby | |
| 5,627,744 A | 5/1997 | Baker et al. | |
| 6,104,171 A | 8/2000 | Dvorsky et al. | |
| 6,194,876 B1 | * 2/2001 | Nagata | 322/5 |
| 2001/0048763 A1 | * 12/2001 | Takatsuka et al. | 382/154 |

* cited by examiner

Primary Examiner—Thomas G. Black
Assistant Examiner—Tuan C To
(74) Attorney, Agent, or Firm—Carlson, Gaskey & Olds (57) ABSTRACT

A vehicle power system includes a multiple of electrical generators which provide power for vehicle electrical systems or loads through an electrical load management center which communicates with a general purpose processor set such that the power supplied to each electrical load may be individually controlled. A display communicates with the GPPS to present an electrical system status screen to the vehicle crew such that the crew is constantly made aware of the prevailing electrical power conditions in a rapid and efficient manner. During a drastically reduced generator situation, the GPPS automatically disconnects loads via a predefined load shed priority list. Once electrical loads are disconnected via the predefined load shed priority list the crew can reactivate and deactivate selected systems for the current mission circumstances through a load recovery screen accessible through the display.

29 Claims, 4 Drawing Sheets

POWER MANAGEMENT UNDER LIMITED POWER CONDITIONS

This invention was made with government support under Contract No.: DAAJD9-91-C-A004 awarded by the Department of the Army. The government therefore has certain rights in this invention.

BACKGROUND OF THE INVENTION

The present invention relates to a power system, and more particularly to the control of electric loads during a generator failure in a multi-generator system.

A power system for a vehicle typically includes two or more generators for redundancy. When one of the generators fails it is necessary to switch vital equipment that was supplied by the failed generator to a working generator. In order to prevent the remaining generator(s) from being overloaded when the additional loads are connected, it is necessary to disconnect, or shed, some of the lower priority loads before other equipment loads are transferred.

One known power system includes a #1 generator associated with a #1 primary bus and a #1 monitor bus. A #2 generator is provided to power a #2 primary bus and a #2 monitor bus. The primary buses are typically used to power higher priority and flight critical equipment, and the monitor buses provide power to lower priority auxiliary and peripheral equipment. Should one of the generators fail, for example the #1 generator, the #1 and #2 monitor buses are automatically de-energized, and the #2 primary bus, and the #1 primary bus are powered from the #2 generator. Equipment must therefore be pre-categorized into mission critical (primary bus) and less-critical (monitor bus) categories.

Entire busses may be subject to cut-off, typically by an electromechanical relay, in cases of severe generating capacity loss. Such automatic, "block" reduction in load protects the vehicle from having the remaining generator overloaded and subsequently cut-off.

Disadvantageously, a block reduction approach requires that the mix of critical and less-critical loads be determined at the time the vehicle is designed and hard-wired into the power system. This categorization may be based on a predefined set of assumptions and generator conditions which may unnecessarily de-energize particular equipment upon generator degradation and thus may not allow for current mission circumstances.

Accordingly, it is desirable to provide a power system which will quickly appraise a vehicle crew of the current generator capacity and power margins such that the impact of additional loads is identifiable. It is further desirable to provide a power system which allows selective alteration and application of equipment loads in response to changing circumstances.

SUMMARY OF THE INVENTION

The vehicle power system according to the present invention includes a multiple of electrical generators which provide power for vehicle electrical systems or loads through an electrical load management center (ELMC). A general purpose processor set (GPPS) is responsive to operator generated commands, vehicle sensors, stored subroutines and program algorithms to instruct the ELMC such that the power supplied to each electrical load may be individually controlled by an associated solid state power controller (SSPC).

The GPPS monitors various vehicle system parameters via a sensor interface (SI) which communicates with each generator. Sensors identify and monitor a multiple of generator operating parameters such as the temperature and pressure of a generator cooling fluid and output voltage and output current. The GPPS can then determine the total load actually being drawn from the generators in terms of kilowatts by multiplying the output voltage by the output current. The GPPS also relates the generator readings from the SI to a generator-rating algorithm stored in the database to determine an allowable load which may be placed on the system. Preferably, the generator-rating algorithm is stored as a look-up table which includes a relationship that rates each generator's capacity as a dependent function of its prevailing cooling fluid characteristics.

A display communicates with the GPPS to present an electrical system status screen to the vehicle crew such that the crew is constantly made aware of the prevailing electrical power conditions in a rapid and efficient manner.

During a drastically reduced electrical supply situation, loads are shed to avoid overloading the remaining operating generator(s). Certain electrical loads are automatically disconnected by deactivating a particular SSPC through GPPS commands to the ELMC via a predefined load shed priority list.

Once electrical loads are disconnected via the predefined load shed priority list the crew may desire to reactivate particular systems for the current mission circumstances. The present invention provides for the reactivation of particular loads which were previously shed according to the predefined load shed priority list. A load recovery screen preferably includes a columnar format having all loads which may be recovered in a TO RECOVER column and all loads which may be shed in a WILL SHED column.

As particular systems are selected on the load recovery screen, a sum of the total loads slated for recovery and a sum of the total loads slated to be shed are indicated at the bottom of each column. When the total loads slated to be shed is equal or greater than the total loads slated for recovery, a recover load selector is activated. By activating the recover load selector, the selections are activated to reconfigure the complement of powered loads as directed by the load recovery screen. In response to the load recovery screen, the GPPS sends instructions to the ELMC such that each selected electrical load is individually actuated or deactivated by remotely controlling the particular SSPC associated with the selected electrical load. Thus, the system is reconfigured to timely provide the crew with the selected operational systems independent of the predefined load shed priority list.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
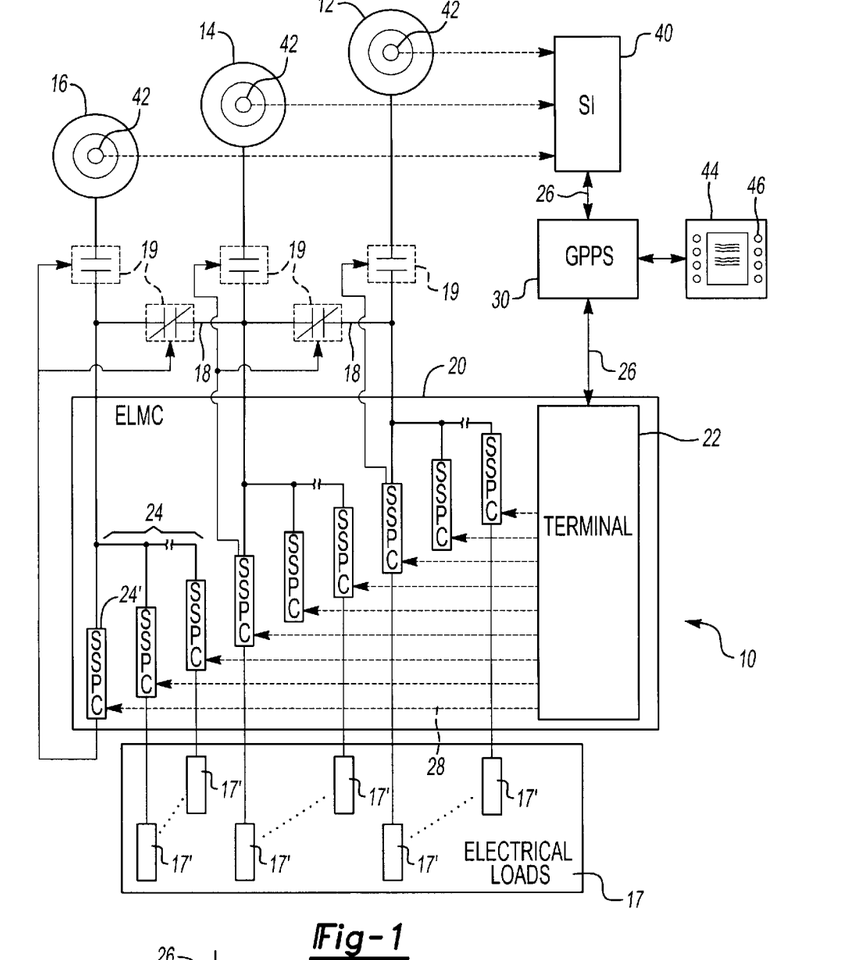
FIG. 1 is schematic block diagram illustrating a vehicle power system which includes a multiple of electrical generators.

FIG. 1 schematically illustrates a vehicle power system 10 which includes a multiple of electrical generators. The system 10 includes a first and a second electrical generator 12,14 and a subsystem power unit (SPU) electrical generator 16 which provide power for vehicle electrical loads 17 through an electrical load management center (ELMC) 20. Each electrical load is representative of a particular vehicle system such as weapon systems, communication systems, counter measure systems, navigation systems, etc., which are powered by the vehicle power system 10.

The ELMC 20 contains a remote terminal section 22 and at least one set of solid state power controllers (SSPC; illustrated schematically at 24). Each SSPC 24' is associated with a particular electrical load 17' such that the power supplied to each electrical load 17' may be individually controlled by the associated SSPC 24'. Although each set of SSPCs 24' in the disclosed embodiment includes (3) SSPCs 24'; it should be realized that any number of SSPCs 24' may make up a set. Preferably, each set of SSPCs 24 are associated with one of the generators 12,14,16, however, the generators 12,14,16 are cross-connected by lines 18 such that each SSPC set 24 is connected to each generator 12, 14, 16 such that any individual SSPC 24' may be powered by any generator 12,14,16. Cut-off switches 19 are preferably included in each cross-connect line 18 to prevent the operating generator(s) power quality from being denigrated by a faulty generator(s) or load fault that does not clear. The loads 17 thereby selectively receive power from the generators 12,14,16 through an associated SSPC 24' which is controlled by the ELMC 20.

The ELMC 20 receives input power from the generators 12,14,16 and control signals on a data bus 26. The ELMC 20 terminal section 22 translates the control signals from the data bus 26 into discrete commands on signal lines 28 to individually operate each SSPC 24'. A general purpose processor set (GPPS) 30 is responsive to operator generated commands, vehicle sensors, stored subroutines and program algorithms to instruct the ELMC 20 via the data bus 26. Each electrical load 17' may thereby be individually actuated or deactivated by remotely controlling the particular SSPC 24' associated with that particular electrical load 17'. Each cut-off switch is also preferably operated by the GPPS 30 as any other load.

Figure 1A:
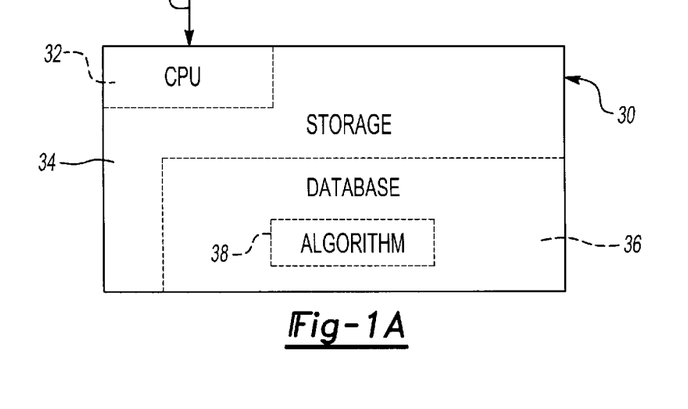
FIG. 1A is schematic block diagram illustrating a general purpose processor set according to the present invention.
Figure 2:
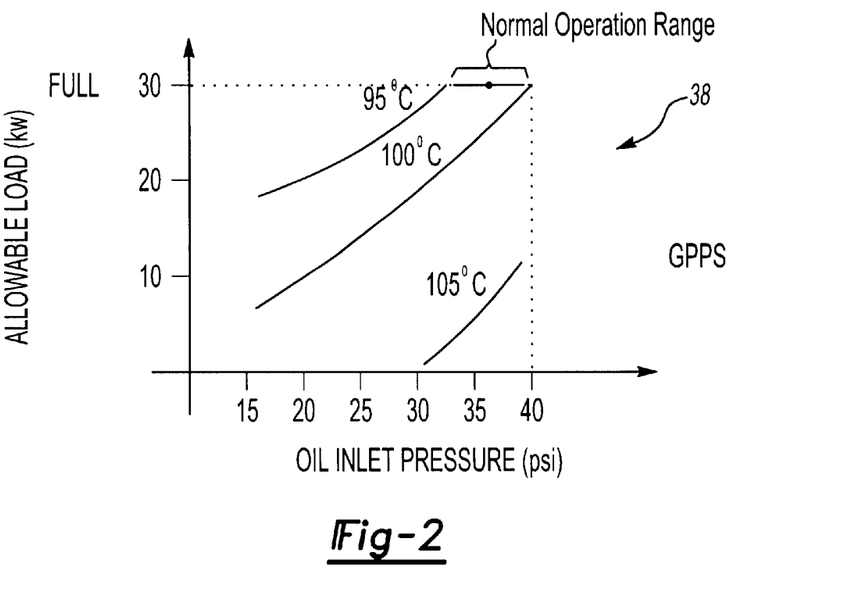
FIG. 2 is a generator capability chart representing a generator-derating algorithm for an electrical generator which relates cooling fluid pressure, fluid temperature and electrical load capability.

The GPPS 30 includes one or more computers, microprocessors or central processing units (illustrated schematically as CPU 32) and a storage device (illustrated schematically at 34) connected to the CPU 32 (FIG. 1A). The storage device 34 may include a hard drive, CD ROM, DVD, RAM, ROM or other optically readable storage, magnetic storage or integrated circuit. The storage device 34 retains a database 36 including a generator-rating algorithm 38, which is preferably stored as a look-up table that follows a predefined capability chart for each generator (FIG. 2; illustrated schematically at 38). Software for the CPU 32, including operation of the generator rating algorithm 38, etc may also be additionally or alternatively stored in storage device 34, ROM, RAM, flash memory or other memory systems.

The GPPS 30 monitors various vehicle system parameters via a sensor interface (SI) 40 which communicate over the data bus 26. The SI 40 preferably communicates with each generator 12, 14, 16 through sensors 42. The SI 40 operates to identify and monitor a multiple of generator operating parameters such as the temperature and pressure of a generator cooling fluid and operating voltage and current. It should be realized that although monitoring of cooling fluid temperature, pressure, voltage and current is disclosed, the monitoring of other generator operating parameters or components will benefit from the present invention. The amount of electrical load demand on the generators 12,14,16 is determined by direct measurement, and changes are predicted by having the particular loads 17 rated power usage stored in GPPS memory.

The system 10 also includes a display 44 such as a multi-function display, high resolution LCD or flat panel display which communicates with the GPPS 30. Input devices 46, preferably a plurality of buttons and directional keypad, but alternatively including a mouse, keyboard, keypad, remote device or microphone allows a crew member to access, operate and control various vehicle systems by communicating with the GPPS 30. Alternatively, the display 44 can be a touch screen display.

The temperature and pressure readings are communicated from the sensors 42 to the GPPS 30 via the SI 40. The GPPS 30 uses the generator readings with the generator-rating algorithm 38 stored in the database 36 to determine the allowable load for each generator 12,14,16. The generator-rating algorithm 38 follows a predefined capability curve for each generator (FIG. 2). Preferably, the generator-rating algorithm defines a look-up table to provide a relationship which rates each generator as a dependent function of its prevailing cooling fluid characteristics. As illustrated by the curve in FIG. 2, when the cooling fluid is within normal pressure and temperature limits, the generator is safely loadable to its full capacity. As the cooling oil temperature rises or source pressure degrades, however, the allowable load which may be applied to the generator is correspondingly lowered in accordance with the relationship to prevent excessive internal generator temperature. Each generator 12,14,16 is thereby safely loaded at any particular time in relation to its prevailing cooling fluid characteristics.

Figure 3:
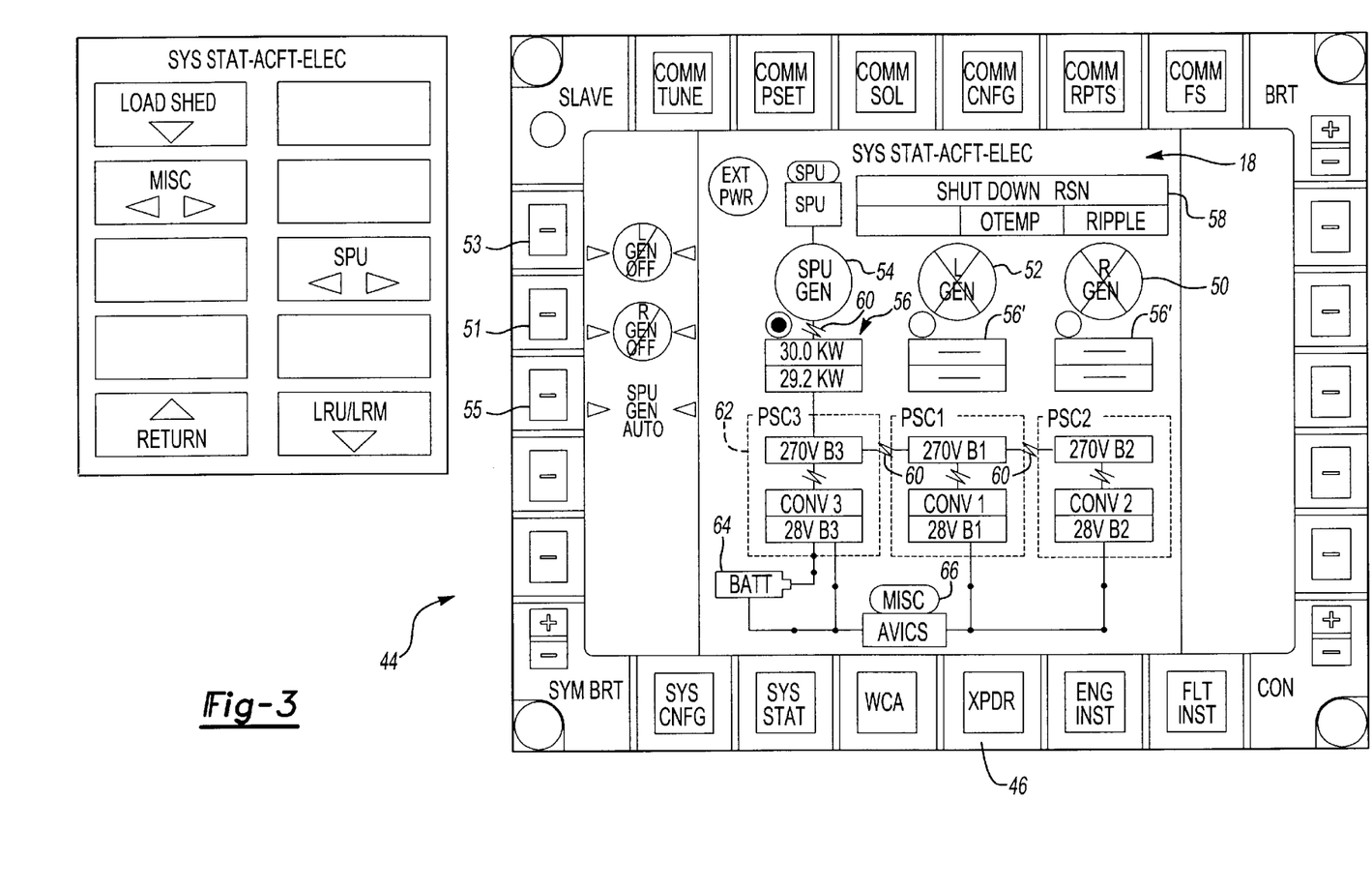
FIG. 3 is a representative display illustrating a multi-functional display presenting an electrical system status screen according to the present invention.

Referring to FIG. 3, the display 44 presents an electrical system status screen 48 for a vehicle such as a helicopter. The electrical system status screen 48 provides symbology which allows an operator to become aware of the prevailing electrical power conditions in a rapid and efficient manner. It should be realized that although a particular symbology and highlighting scheme is provided in the disclosed embodiment, other symbology, symbol shape, symbol orientation, highlighting, flashing, color, brightening, outlining, inverting or visual arrangement will also benefit from the present invention.

The electrical system status screen 48 illustrated in FIG. 3, illustrates an exemplary flight condition in which the first and second (Right and Left) generator 12,14 are unavailable. The generator symbol 50,52 associated with the first and second generator 12, 14 are crossed out while the SPU generator symbol 54 is highlighted indicating operational capability. Further, manual activation switches 51,53 associated with the first and second generator 12, 14 are also crossed out, while the SPU activation switch 55 is not.

The capability of the SPU generator is indicated in a divided box capability symbol 56 directly below the SPU generator symbol 54. The allowable load (30.0 KW) is indicated in the upper portion of the box while the actual load (29.2 KW) is indicated in the lower portion of the box. A quick assessment of the current electrical power operating status and margin therebetween is thereby provided. The capability symbol 56' below each generator symbol 50,52 are inactive as no power capability is available from generators 12,14.

No power supply lines emanate from the generator symbols 50, 52 to illustrate that cut-off switches 19 (FIG. 1) to generators 12,14 have been activated to prevent the SPU generator 16 power quality from being denigrated by the faulty generators 12, 14. Preferably, a shutdown reason symbol 58 defines why each particular generator has been shutdown such as, for example only, over temperature and excessive ripple. Other detailed status or failure reasons may additionally or alternatively be provided on this or other screens.

Power supply line 60 which emanates from SPU generator symbol 54 is connected to a power system controller symbol (PSC3) 62 which represents a particular SSPC set 24 (FIG. 1). Because of the shutdown of generators 12,14, the remaining SSPC sets 24 (PSC1 and PSC2) will also receive power from the SPU generator 16 through cross connection lines 18 (FIG. 1) and power supply line 60. The electrical system status screen 48 also illustrates that all busses and associated converters are operational by highlighting each of these symbols, i.e., 270VB3, CONV3, 28VB3, 270VB2, CONV2, 28VB2, 270VB1, CONV1, 28VB1. In addition, symbols for battery back-up 64 and associated avionics 66 are also highlighted to indicate fall mission capability.

Upon loss of a generator the electrical loads are automatically switched to a second generator by the ELMC 20. Therefore, there may not be an immediate loss of loads as there is with the monitor bus approach. The electrical power system continues to provide power to all of the operating loads and will appear normal from the operator's point of view. As the amount of electrical load demand increases, which is a function of operational demand, the total power required may exceed the nominal rated capacity of the operating generator(s). This is possible because a generator can produce more power than its nominal rating under certain operational conditions.

During a drastically reduced generator supply situation such as that illustrated in FIG. 3, certain loads are shed rather than being transferred to an operating generator. Certain electrical loads 17 are automatically disconnected by deactivating a particular SSPC 24' through GPPS 30 commands to the ELMC 20 via a predefined load shed priority list stored in the storage device 34 (FIG. 1). The GPPS 30 is programmed to preferably individually shed auxiliary and non-mission critical loads which will have a minimal affect on the vehicle. As more capacity is lost, relatively more critical loads are shed.

Once electrical loads 17 are disconnected via the predefined load shed priority list stored in the storage device 34, an operator may desire to reactivate particular systems for the current mission circumstances. The present invention provides for the reactivation of particular loads which were shed according to the predefined load shed priority list and for the shedding of loads which have not been shed according to the predefined load shed priority list.

Figure 4:
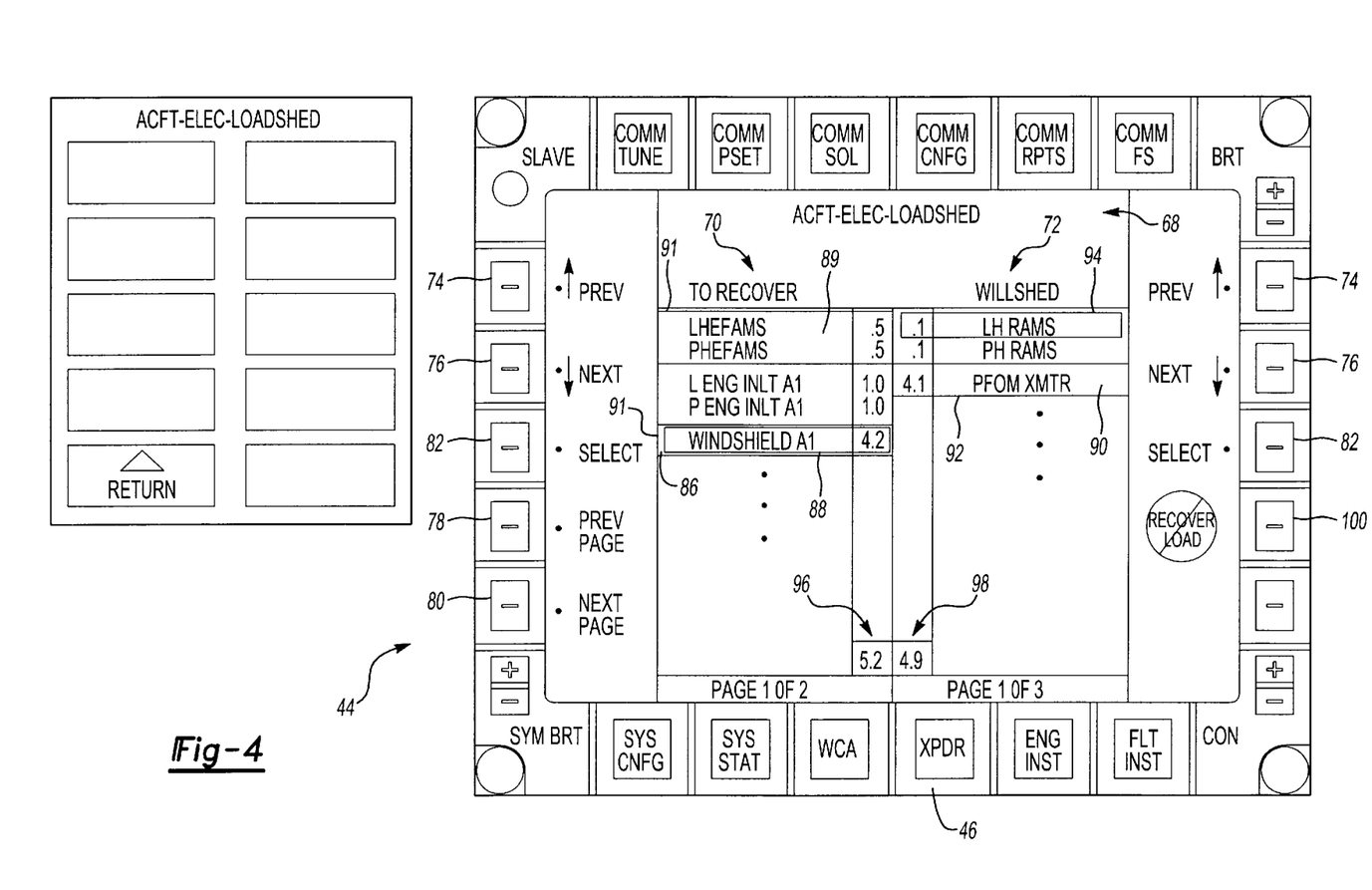
FIG. 4 is a representative display illustrating the multi-functional display of FIG. 3 presenting a load recovery screen according to the present invention.

Referring to FIG. 4, the display 44 presents a load recovery screen 68 which is preferably accessible from electrical system status screen 48 (FIG. 3). The load recovery screen 68 provides symbology which allows an operator to selectively alter equipment loads in response to changing circumstances.

The load recovery screen 68 preferably includes a columnar format having all loads which may be recovered in a TO RECOVER column 70 and all loads which may be shed in a WILL SHED column 72. An operator moves through the list with inputs defined by the load recovery screen 68. Preferably, inputs such as previous 74, next 76, previous page 78, and next page 80 are associated with each column 70,72. It should be understood that other commands will also benefit from the present invention.

An operator scrolls through the list of loads and selects particular loads to be recovered or shed by a select key 82 also associated with each column 70,72. The loads which have been selected are preferably highlighted in a manner such as by outlining. The load recovery screen 68 illustrated in FIG. 4, illustrates an exemplary recovery condition in which left and right munitions system 84 and windshield deicing system 86 loads have been selected for recovery as indicated by outlining 91. A cursor 88 in the TO RECOVER column 70 highlights the windshield deicing systems 86. Also, a countermeasure transmitter system 90 has been selected in the WILL SHED column 72 as indicated by the outlining 92. A second cursor 94 in the WILL SHED column 72 highlights a left integrated retractable munitions subsystem but this system has not been selected to be shed (no outlining).

As particular systems are selected on the load recovery screen 68, a sum of the total loads slated for recovery 96 and a sum of the total loads slated to be shed 98 are indicated at the bottom of each column 70,72. The total loads slated to be shed 98 preferably includes the unused capacity of the system 10. As illustrated, the total loads slated to be shed 98 includes an additional 0.8 KW presently available from the SPU generator (FIG. 3).

When the total loads slated to be shed 98 is equal or greater than the total loads slated for recovery 96, a recover load selector 100 is activated. If, however, the total loads slated to be shed 98 plus the unused generator capacity are not equal or greater than the total loads slated for recovery 96, the recover load selector 100 will be crossed out as illustrated in FIG. 4. Other further selections must therefore be made prior to reconfiguration of the complement of powered loads.

By activating the recover load selector 100, the selections are activated to reconfigure the complement of powered loads as directed by the crew and in accordance with the load recovery screen 68. In response to the load recovery screen 68, the GPPS 30 sends instructions to the ELMC 20 via the data bus 26 such that each selected electrical load 17 is individually actuated or deactivated by remotely controlling the particular SSPC 24' associated with the selected electrical load 17. Thus, the system 10 is reconfigured to timely provide the crew with the selected operational systems independent of the predefined load shed priority list.

The present invention is equally applicable to both AC and DC electrical load systems, as described herein above, generators are provided with a nominal rated capacity which may also be derated in accordance with the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A power system for a vehicle having a multiple of generators, said system comprising:
   a database including a generator rating algorithm;
   a controller for determining an actual load applied to each generator, and an allowable load for each generator in relation to said generator rating algorithm;
   a display for displaying said actual load and said allowable load for each generator, said display displaying a plurality of user selectable electrical loads to be shed; and
   said controller operable to add at least one user selectable electrical load from said plurality of displayed user selectable electrical loads to be shed to a shed total when selected by a user, and activating at least one user selected electrical loads to be recovered which comprise a recover total if said shed total is at least equal to said recover total.

2. The power system as recited in claim 1, wherein said generator rating algorithm includes a look-up table to determine said allowable load for each generator.

3. The power system as recited in claim 1, wherein said generator rating algorithm includes a relationship between a temperature and a pressure of a cooling fluid to determine said allowable load.

4. The power system as recited in claim 1, wherein said database includes a predetermined load shed list such that each load in said predetermined load shed list is shed individually in an order determined by said predetermined load shed list.

5. The power system as recited in claim 1, wherein said display includes a recover screen displaying a shed list and a recover list.

6. The power system as recited in claim 5, wherein each load within said shed list and each load within said recover list is individually selectable.

7. The power system as recited in claim 6, further including a recover load switch, said recover screen includes a shed total of loads selected to be shed and a recover total of loads selected to be recovered, said recover load switch being activatable if said shed total is at least equal to said recover total.

8. The power system as recited in claim 6, wherein said recover screen includes a shed total of loads selected to be shed and a recover total of loads selected to be recovered.

9. The power system as recited in claim 8, wherein said shed total includes an unused capacity defined by subtracting said actual load from said allowable load.

10. The power system as recited in claim 1, wherein said at least one user selected electrical load to be shed which comprise said shed total are deactivated simultaneous with activation of said at least one user selected electrical load to be recovered which comprise said recover total upon activation of a recover load switch.

11. The power system as recited in claim 1, wherein said plurality of user selectable electrical loads to be shed are displaced as a list.

12. A method of controlling loads to a power system for a vehicle having a multiple of generators comprising the steps of
   (1) determining an actual load applied to each generator;
   (2) determining an allowable load for each generator;
   (3) displaying said actual load and said allowable load for each generator;
   (4) displaying a plurality of user selectable electrical loads to be shed;
   (5) determining a shed total by summing at least one of the user selectable electrical loads selected from the plurality of user selectable loads displayed in said step (4); and
   (6) activating at least one user selected electrical load to be recovered which comprise a recover total if the shed total determined in said step (5) is at least equal to the recover total.

13. A method as recited in claim 12, wherein said step 1 includes communicating with an electronic load management center having a plurality of solid state power controllers, each of said solid state power controllers supplying power to an electrical load.

14. A method as recited in claim 12, wherein said step 2 includes calculating said allowable load in response to a generator rating algorithm relating generator operating characteristics.

15. A method as recited in claim 14, wherein said generator operating characteristics include a cooling fluid pressure and a cooling fluid temperature.

16. A method as recited in claim 12, further including the step of shedding a multiple of electrical loads according to a predetermined load shed list such that each load is shed individually in an order determined by said list in response to a reduced generator capacity condition.

17. A method as recited in claim 16, further including the step of redistributing said allowable electrical load during said reduced generator capacity condition including the steps of:
   (1) selecting particular electrical loads to be recovered;
   (2) selecting particular electrical loads to be shed; and
   (3) activating said particular electrical loads to be recovered and deactivating said particular electrical loads to be shed if a shed total of said particular electrical loads to be shed is at least equal to a recover total of said particular electrical loads to be recovered.

18. A method as recited in claim 17, wherein said shed total includes an unused capacity of said generator during said reduced generator capacity condition.

19. A method as recited in claim 12, wherein said step (6) further comprising the step of:
   activating a recover load switch; and
   deactivating the at least electrical loads to be shed as selected in said step (4) which comprise the shed total simultaneous with activating the at least one user selected electrical loads in be recovered which comprise the recover total if the shed total is at least equal to the recover total.

20. A method as recited in claim 12, wherein said step (4) further comprises displaying said plurality of user selectable electrical loads to be shed as a list.

21. A method of redistributing loads to a power system for a vehicle having a multiple of generators during a reduced generator capacity condition, said method comprising the steps of:
   (1) shedding a multiple of electrical loads according to a predetermined load shed list such that each load is shed individually in an order determined by said list in response to the reduced generator capacity condition;
   (2) selecting at least one user selectable electrical load to be recovered;
   (3) selecting at least one user selectable electrical load to be shed; and
   (4) activating said particular electrical loads to be recovered and deactivating said particular electrical loads to be shed if a shed total of said user selected electrical loads to be shed is at least equal to a recover total of said user selected electrical loads to be recovered.

22. A method as recited in claim 21, wherein said shed total includes an unused capacity of said generator during said reduced generator capacity condition.

23. A method as recited in claim 21, further including the step of calculating an allowable load for each operating generator during said reduced generator capacity condition in response to a generator rating algorithm relating a multiple of generator operating characteristics.

24. A method as recited in claim 23, wherein said generator operating characteristics include a cooling fluid pressure and a cooling fluid temperature.

25. A power system for a vehicle having a multiple of generators, said system comprising:
   a database comprising a generator rating algorithm, said database comprising a k predetermined load shed list such that each load in said predetermined load shed list is shed individually in an order determined by said predetermined load shed list;
   a controller for determining an actual load applied to each generator, and an allowable load for each generator in relation to said generator rating algorithm; and
   a display for displaying said actual load and said allowable load for each generator.

26. A power system for a vehicle having a multiple of generators, said system comprising:
   a database comprising a generator rating algorithm;
   a controller for determining an actual load applied to each generator, and an allowable load for each generator in relation to said generator rating algorithm; and
   a display for displaying said actual load and said allowable load for each generator, said display comprising a recover screen displaying a shed list and a recover list.

27. A method of controlling loads to a power system for a vehicle having a multiple of generators comprising the steps of:
   (1) determining an actual load applied to each generator;
   (2) determining an allowable load for each generator;
   (3) displaying said actual load and said allowable load for each generator; and
   (4) shedding a multiple of electrical loads according to a predetermined load shed list such that each load is shed individually in an order determined by said list in response to a reduced generator capacity condition.

28. A method of redistributing loads to a power system for a vehicle having a multiple of generators during a reduced generator capacity condition, said method comprising the steps of:
   (1) shedding a multiple of electrical loads according to a predetermined load shed list such that each load is shed individually in an order determined by said list in response to the reduced generator capacity condition;
   (2) selecting particular electrical loads to be recovered;
   (3) selecting particular electrical loads to be shed; and
   (4) activating said particular electrical loads to be recovered and deactivating said particular electrical loads to be shed if a shed total of said particular electrical loads to be shed is at least equal to a recover total of said particular electrical loads to be recovered, said shed total includes an unused capacity of said generator during said reduced generator capacity condition.

29. A method of redistributing loads to a power system for a vehicle having a multiple of generators during a reduced generator capacity condition, said method comprising the steps of:
   (1) shedding a multiple of electrical loads according to a predetermined load shed list such that each load is shed individually in an order determined by said list in response to the reduced generator capacity condition;
   (2) selecting particular electrical loads to be recovered;
   (3) selecting particular electrical loads to be shed; and
   (5) activating said particular electrical loads to be recovered and deactivating said particular electrical loads to be shed if a shed total of said particular electrical loads to be shed is at least equal to a recover total of said particular electrical loads to be recovered; and
   (5) calculating an allowable load for each operating generator during said reduced generator capacity condition in response to a generator rating algorithm relating a multiple of generator operating characteristics.

* * * * *

UNITED STATES PATENT AND TRADEMARK OFFICE
CERTIFICATE OF CORRECTION

PATENT NO.    : 6,633,802 B2
DATED         : October 14, 2003
INVENTOR(S)   : Sodoski et al.

It is certified that error appears in the above-identified patent and that said Letters Patent is hereby corrected as shown below:

<u>Title page,</u>
Item [75], Inventors, "Bruce S. Hamilton" should be -- Bruce E. Hamilton --

<u>Column 9,</u>
Line 18, please delete the "k" between "a" and "predetermined"

Signed and Sealed this

Twenty-seventh Day of January, 2004

JON W. DUDAS
*Acting Director of the United States Patent and Trademark Office*